Patented Dec. 12, 1950

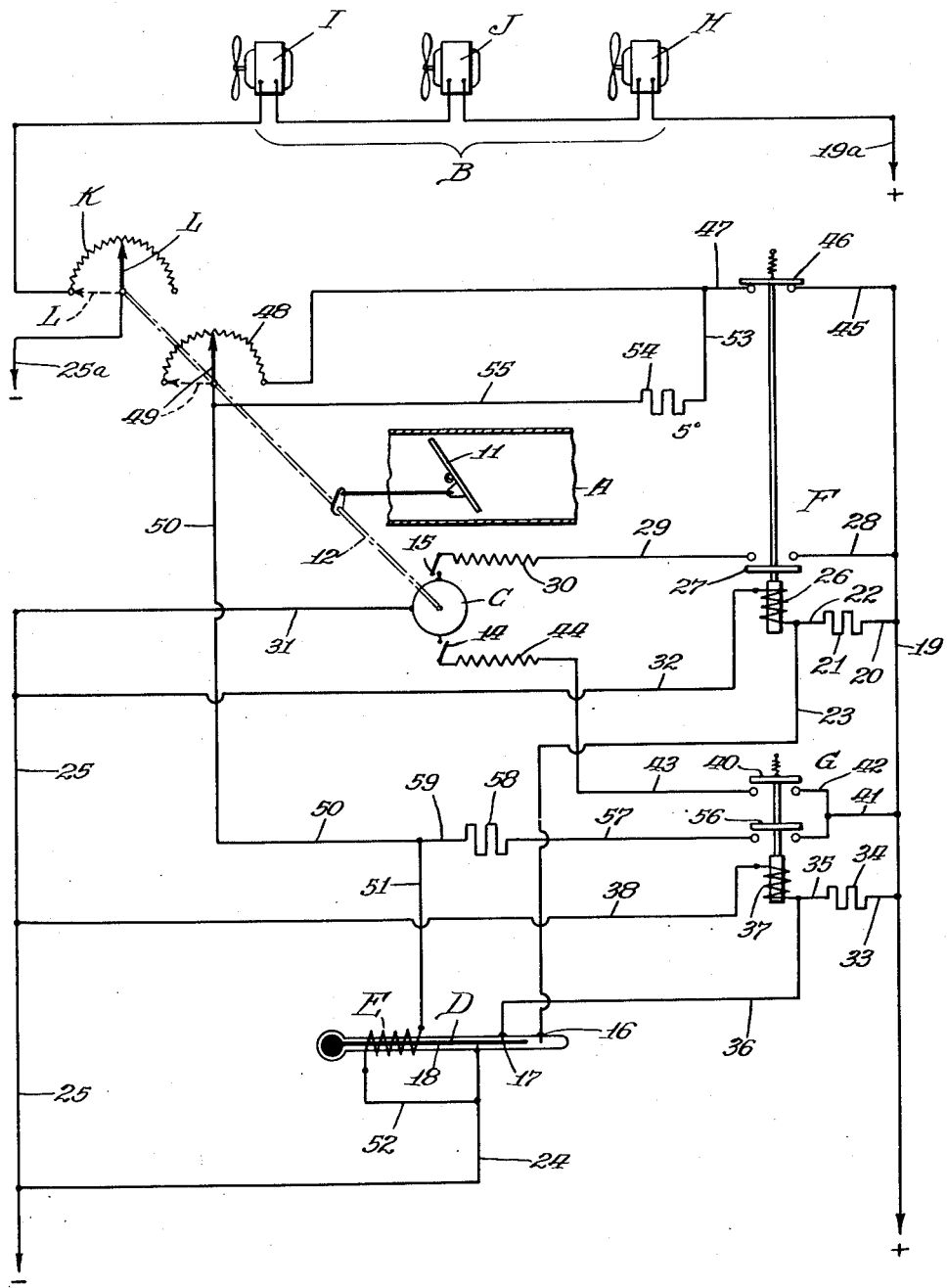

2,534,174

UNITED STATES PATENT OFFICE 2,534,174

COMBINED VENTILATION AND HEAT CONTROL SYSTEM

Timothy J. Lehane and Everett H. Burgess, Chicago, Ill., assignors, by mesne assignments, to Vapor Heating Corporation, a corporation of Delaware Application April 14, 1947, Serial No. 741,182

10 Claims. (Cl. 236—49)

This invention relates to improvements in combined ventilation and heat control systems.

A principal object of the invention is to provide, in a control system of the above character, improved means for varying the effectiveness of the ventilation of an enclosed space in relation to the volume of heat delivered into the space, whereby the ventilation is made more effective as the delivery of heat is decreased. In this connection the invention contemplates automatic adjustment of the ventilating apparatus in reverse proportionate relation to the volume of heat delivered into the said enclosed space so as to provide maximum ventilation when no heat is being delivered into the enclosed space and to provide minimum ventilation when the need for heat is greatest.

A further object is to provide a temperature control system of the above character in which the delivery of heat into an enclosed space and the effectiveness of the ventilation of the space is controlled by a thermostat whose functional setting is automatically altered during the rise and fall of the temperature within the space, whereby the sensitivity of the thermostat to temperature changes in the space is proportionately increased and decreased in relation to the heating requirements necessary to maintain a suitable temperature within the space.

A further object is to provide a temperature responsive system for adjusting the heat supply and the effectiveness of the ventilation of an enclosed space by a series of adjustments which are made intermittently and which vary both as to their extent and duration in relation to the heating requirement, whereby a modulated control of the heat supply and of the ventilation may be maintained between the upper and lower limits of a predetermined temperature range.

The invention may be briefly described as including heating means A and ventilating means B which are operatively controlled by means of connections with a reversible electric motor C. The connection between the motor C and the heating means A decreases the supply of heat when the motor is operated in one direction and increases the supply of heat when the motor is operated in a reverse direction. The operative control connection between said motor C and the ventilating means B effects adjustments, whereby the effectiveness of the ventilating means is increased and decreased, respectively, during concomitant decreases and increases in the heat supply.

The above adjustments are automatically controlled by a control thermostat set to function at the upper and lower limits of a predetermined temperature range, which functional settings may be automatically varied duirng the operation of the system, within said predetermined temperature range, by increasing and decreasing supplies of auxiliary heat delivered by an auxiliary heater E associated with said thermostat D.

The invention, therefore, contemplates as a further specific object, the provision of a ventilation and temperature control system constructed to operate in the manner hereinabove described.

The invention is illustrated diagrammatically in the accompanying drawing in connection with a heating apparatus A in the form of a valved duct for delivering heated air into an enclosed space. This specific form of heating apparatus is shown merely as one suitable form of apparatus. It will be understood, therefore, that any other suitable form of heating apparatus may be used. The amount of heat delivered into the space is controlled by a valve 11 which is operatively connected to a drive shaft 12 of the reversible motor C. The operation of the said motor in one direction, for example in a clockwise direction, moves the valve 11 from its closed position or any position within its operating limits toward its fully open position. The operation of the motor in the reverse direction moves the valve 11 toward its fully closed position. Suitable limit switches 14 and 15 are interposed in the motor operating circuits so as to interrupt the operation of the motor when the valve 11 reaches either of its extreme opened or closed positions.

The valve 11 is illustrated in the drawing in a partially opened position. Consequently some heat is being delivered into the enclosed space. The said valve 11 may be moved either toward its closed position or toward its open position by operation of the reversible motor C in the appropriate direction to bring about the result desired.

The motor operating circuits, to be hereinafter described, are controlled by their respective relays F and G by the functioning of thermostat D. This thermostat is preferably of the mercury column type and is so located as to respond to temperature changes within the space whose temperature is being controlled. It is provided with spaced contacts 16 and 17 which represent the upper and lower limits, respectively, of a predetermined temperature range and these contacts are in circuits which control the energization of the relays F and G.

Circuits for controlling valve closing

When the mercury column 18 of the thermostat stands between the contacts 16 and 17 the valve 11 and motor C remain stationary. However, if the temperature at the thermostat is sufficient to cause its mercury column 18 to engage the outer contact 16 a circuit is established which leads from positive line 19 through wire 20, resistor 21 and wires 22 and 23 to the contact 16, and thence through the mercury column 18 and wire 24 to the negative line 25. This circuit by-passes electric current around the solenoid 26 of relay F so as to de-energize the same and thereby cause the contact 27 of relay F to close an energizing circuit through the motor C to impart a closing movement to valve 11. This motor circuit leads from positive line 19 through wire 28, closed contact 27 of relay F, wire 29 and motor field 30 to limit switch 15, and thence through wire 31 to the negative line 25. This motor operating circuit will remain closed until the cooling effect on the thermostat causes the mercury column 18 to recede from the upper contact 16 or until the valve 11 reaches its fully closed position. Assuming, for the present, that the thermostat circuit is opened at contact 16 by the fall of the temperature at the thermostat such opening of the thermostat circuit, reestablishes an energizing circuit for the solenoid 26. This circuit leads from the positive line 19 through wire 20, resistor 21 and wire 22 through solenoid 26, and thence through wire 32 to the negative line 25.

Circuits for controlling valve opening

Assuming now that the temperature at the thermostat D continues to decline until the mercury column 18 moves below the lower contact 17, the condition opens a circuit leading from positive line 19 through wire 33, resistor 34 and wires 35 and 36 to the lower contact 17 of the thermostat, and thence through the mercury column 18 and wire 24 to the negative line 25. The said opening of this circuit reestablishes an energizing circuit through the solenoid 37 of the relay G to energize the relay. The energizing circuit leads from positive line 19 through wire 33, resistor 34, wire 35, solenoid 37 and wire 38 to the negative line 25. When the upper contact 40 of relay G is in its closed position a circuit for imparting counterclockwise movement to the motor C is established to impart an opening movement to the valve 11. This circuit leads from the positive line 19 through wires 41 and 42 to the relay contact 40, thence through wire 43, motor field 44, closed limit switch 14 and wire 31, to the negative line 25. This movement of the motor imparts an opening movement to the valve 11 and the valve opening movement will continue until the temperature at the thermostat D is sufficient to cause the mercury column to reengage the contact 17 and thereby interrupt the opening movement of the valve or until the valve reaches its fully open position.

Modulated movements of valve 11

While it is possible for the valve 11 to move from one extreme position to the other to correct an abnormal temperature condition, for example during the heat-up of the space from an abnormally low temperature or during the cooling of the space from an abnormally high temperature, the valve 11 will be normally moved from one reversing position to another by a series of modulated movements. This result is obtained by applying auxiliary heat in variable amounts to the thermostat D. The means for applying the auxiliary heat includes an electric heater E which receives its electric current from one or more of three circuits. One of these circuits leads from positive 19 through wire 45, closed contact 46 of relay F, wire 47, variable resistance 48, movable contact 49 and wires 50 and 51, to the auxiliary heater E, and thence through wires 52 and 24 to the negative line 25. This heating circuit is effective only when the valve closing circuit of motor C is open, that is to say, when the mercury column 18 is below the upper contact 16 of the thermostat D. The second circuit for supplying heating current to the auxiliary heater E leads from the closed contact 46 of relay F through wires 47 and 53 to a resistor 54, and thence through wires 55, 50 and 51, to the electric heater, and thence through wires 52 and 24 to the negative line 25. This circuit is also effective only when the valve closing circuit of the motor C is open. The third circuit for supplying electric currtnt to the heater E, leads from the positive line 19 through wires 41 and 42 through lower contact 56 of relay G to wire 57, and resistor 58, wires 59 and 51, to the heater E, and thence through wires 52 and 24, to the negative line 25. This heating circuit, it will be observed, is effective only when the relay G is energized, for example, when the mercury column 18 of thermostat D stands below its lower contact 17.

Variation of auxiliary heat

As previously indicated, the spacing between the thermostat contacts 16 and 17 respesents a predetermined temperature range. For the purpose of this illustration, the said spacing may be regarded as five degrees (5°). The fixed resistors 54 and 58 each have a heating control value which is preferably, though not necessarily, equal to the spacing between the said contacts 16 and 17. The total value of resistor 48 is such that when the enclosed space stands at the lower limit of said temperature range the mercury column 18, because of the heat supplied by the total resistances 54 and 48 will stand at the lower contact 17 of the thermostat. When the spaced temperature rises to the upper limits of said temperature range, assuming that the full resistances 54 and 48 are in the circuit, the mercury column 18 will engage the upper contact 16 of the thermostat. In other words, the maximum temperature of the enclosed space and the aggregate temperature values of the resistance 54 and 48 will equal the temperature setting of the upper contact 16.

The actual amount of auxiliary heat applied to the thermostat is increased so as to lower the temperature settings of the thermostat as the heat valve 11 is moved toward its full open position. Likewise, the actual amount of auxiliary heat applied to thermostat D is decreased so as to raise the temperature settings thereof as the supply of heat is decreased. This result is obtained by connecting the movable contact 49 of the variable resistance to the motor shaft 12 so that the amount of auxiliary heat supplied to the thermostat is increased and decreased, respectively, in relation to the opening and closing movements of the valve 11. For example, let it be assumed that the valve 11 is in the position indicated in the drawing and that the mercury column moves into engagement with the thermostat contact 16, the relay F will be momentarily de-energized and thereby close a circuit through motor C to impart a momentary closing movement to the valve 11. This momentary operation is brought about by the rapid cooling of the heater E, since the de-energizing of the relay F also opens the contact 46 and thereby removes all auxiliary heat from the heater E. The valve closing movement of motor C, in addition to moving the valve nearer to its closed position and thereby reduce the supply of heat, also moves the movable contact 49 toward the left and thereby reduces the amount of heating current supplied through the variable resistor 48 to the heater E. This step-by-step closing of the valve 11 and the proportionate decreases in the heating current supplied through resistor 48 will continue until the valve 11 is fully closed.

In the closed position of valve 11, the limit switch 15 is opened and the limit switch 14 is closed. It will be observed therefore that the next operating movement of the valve 11 must be in an opening direction, but the relay F may continue to open and close the heater circuit through resistors 54 and 48. This condition, however, will continue only so long as the temperature of the space remains at the upper limits of its temperature range. When the temperature within the space is lowered sufficiently to cause the mercury column to recede below the lower contact 17, the by-pass circuit through said contact 17 will be broken and thereby effect the energization of relay G. This energization of relay G closes its contact 40 to establish an operating circuit through the motor C to rotate it in a direction to open the valve 11. The energization of the motor through relay G to open the valve, also closes the said third heater circuit through the relay contact 56 and the resistor 53 so as to add five additional degrees (5°) of heat to the auxiliary heater E. This additional heat will be sufficient to momentarily close the by-pass circuit through the lower contact 17 of the thermostat until the valve 11 reaches its full open position or to such other position of heat supply as may be necessary to balance the heat loss from the space. During the opening movement of the valve 11, the movable contact 49 will be moved toward the right so as to progressively reduce the amount of resistance in the auxiliary heater circuit and thereby proportionately increase the amount of auxiliary heat applied to the thermostat D.

*Ventilating apparatus*

The ventilating apparatus may comprise one or more electric fans for supplying fresh air to the enclosed space, withdrawing air from the space or for merely circulating the air within the space. The fans H and I, indicated in the drawing, may be regarded as inlet and exhaust fans, respectively, and the fan J may be regarded as an impeller for circulating the air within the space. The three fans are preferably connected in series so that their speed of operation and consequently their effectiveness will be synchronized.

In accordance with the principle of the present invention all fans of the ventilating apparatus B are varied, as to their speed of operation, so that they will be most effective when the heating apparatus is the least effective, that is to say, the fans H, I and J are operated at their maximum speeds when the heat valve 11 is in its closed position and are operated at their minimum speeds when the heat valve 11 is in its fully open position. The speeds of the said fans are also proportionately varied for different positions of the heat valve 11. In order to accomplish this result a variable resistor K is interposed in the fan operating circuit between the positive line 19a and the negative line 25a. A movable contact L associated with the variable resistor K is connected to the motor shaft 12 so that it will move simultaneously with the movable contact 49 of the variable resistor 48. The resistors 48 and K, however, are so arranged that when the movable contact 49 is in the dotted line position the full resistance 48 is in the heater circuit and when the movable contact L associated with resistor K is in the dotted line position the resistance K is least effective in the fan operating circuit. Consequently, the fans H, I and J will operate at their maximum speeds when the heat valve 11 is in its closed position and the thermostat D is receiving the least amount of auxiliary heat. When the movable contacts 49 and L are moved to their extreme position to the "right" the maximum amount of heat will be applied to the auxiliary heater E of thermostat D and the greatest amount of resistance will be introduced into the fan operating circuit so that the introduction and withdrawal of air from the enclosed space and the circulation of air within the space will be minimized when maximum heat is required to maintain a suitable temperature within the enclosed space.

We claim:

1. In combination with apparatus for heating an enclosed space and apparatus for ventilating the space; of a reversible electric motor operatively connected with said heating apparatus to control the delivery of heat into said space and operatively connected with the ventilating apparatus for controlling its effectiveness, means for controlling the energization of said motor comprising a thermostat responsive to the temperature of the space and set to function at the lower limit of a predetermined temperature range to effect energization of said motor to operate it in a direction to increase the supply of heat to the space and to decrease the effectiveness of said ventilating apparatus and set to function at the upper limit of said temperature range to effect energization of said motor to operate it in a direction to decrease the supply of heat and to increase the effectiveness of said ventilating apparatus, an electrical auxiliary heater for the thermostat, an energizing circuit therefor, a relay for closing said heater energizing circuit, and a control circuit for said relay connected through the thermostat at a point representing the upper limit of said temperature range, whereby said relay is effective below said upper limit of said temperature range to close said heater energizing circuit and to open the said circuit at said upper limit of said temperature range, a second energizing circuit for said auxiliary heater, a second relay for closing the said second energizing circuit, and a control circuit for said second relay connected through said thermostat at a point representing the lower limit of said temperature range, whereby the said second relay is effective below the lower limit of said temperature range to close said second energizing circuit through said auxiliary heater and to open said second energizing circuit at said lower limit of said temperature range, 2. In combination with an adjustable valve for varying the heat supply to an enclosed space, an electrically operated impeller for ventilating the space, and a variable resistance in the operating circuit of the impeller for controlling its operating speed; of a reversible electric motor operable in one direction to adjust said valve and said variable resistance to increase the supply of heat and to reduce the speed of said impeller and operable in a reverse direction to adjust said valve and said variable resistance to decrease the supply of heat and to increase the speed of said impeller, means for controlling the directional energization of said motor comprising a thermostat responsive to the temperatures within the space and operative at the lower limit of a predetermined temperature range to effect energization of said motor in one direction and operative at a higher temperature to effect energization of the motor in a reverse direction, an electrical auxiliary heater for the thermostat, an energizing circuit therefor, a relay for closing said heater energizing circuit, and a control circuit for said relay connected through said thermostat at a point representing the lower limit of said temperature range, whereby said relay is effective below the lower limit of said temperature range to close said heater energizing circuit and to open said circuit at said lower limit of said temperature range.

3. In combination with an adjustable valve for varying the heat supply to an enclosed space, an electrically operated impeller for ventilating the space, and a variable resistance in the operating circuit of the impeller for controlling its operating speed; of a reversible electric motor operable in one direction to adjust said valve and said variable resistance to increase the supply of heat and to reduce the speed of said impeller and operable in a reverse direction to adjust said valve and said variable resistance to decrease the supply of heat and to increase the speed of said impeller, means for controlling the directional energization of said motor comprising a thermostat responsive to the temperatures within the space and operative at a predetermined temperature to effect energization of said motor in one direction and operable at a higher temperature to effect energization of the motor in a reverse direction, an electrical auxiliary heater for the thermostat, an energizing circuit therefor, a relay for closing said heater energizing circuit, a control circuit for said relay connected through said thermostat at a point representing the lower of said predetermined temperatures, whereby said relay is effective below the lower temperature to close said heater energizing circuit and to open said circuit at said lower temperature, a variable resistor in said heater circuit, and means operatively connected with said motor for carrying the supply of heating current to said auxiliary heater in relation to the extent of the movement of said motor.

4. In combination with an adjustable valve for varying the heat supply to an enclosed space, an electrically operated impeller for ventilating the space, and a variable resistance in the operating circuit of the impeller for controlling its operating speed; of a reversible electric motor operable in one direction to adjust said valve and said variable resistance to increase the supply of heat and to reduce the speed of said impeller and operable in a reverse direction to adjust said valve and said variable resistance to decease the supply of heat and to increase the speed of said impeller, means for controlling the directional energization of said motor comprising a thermostat responsive to the temperatures within the space and operative at a predetermined temperature to effect energization of said motor in one direction and operable at a higher temperature to effect energization of the motor in a reverse direction, an electrical auxiliary heater for the thermostat, an energizing circuit therefor, a relay for closing said heater energizing circuit, a control circuit for said relay connected through said thermostat at a point representing the lower of said predetermined temperatures, whereby said relay is effective below said lower temperature to close said heater energizing circuit and to open said circuit at said lower temperature, a variable resistor in said heater circuit, and means operatively connected with said motor for inversely varying the supply of heating current to said auxiliary heater in relation to the concomitant change in the speed of said impeller.

5. In combination with an adjustable valve for varying the heat supply to an enclosed space, an electrically operated impeller for ventilating the space, and a variable resistance in the operating circuit of the impeller for controlling its operating speed; of a reversible electric motor operable in one direction to adjust said valve and said variable resistance to increase the supply of heat and to reduce the speed of said impeller and operable in a reverse direction to adjust said valve and said variable resistance to decrease the supply of heat and to increase the speed of said impeller, means for controlling the directional energization of said motor comprising a thermostat responsive to the temperatures within the space and operable at the upper limit of a predetermined temperature range to effect energization of said motor in one direction and operative at a lower temperature to effect energization of the motor in a reverse direction, an electrical auxiliary heater for the thermostat, an energizing circuit therefor, a relay for closing said heater energizing circuit, and a control circuit for said relay connected through said thermostat at a point representing the upper limit of said temperature range, whereby said relay is effective below the upper limit of said temperature range to close said heater energizing circuit and to open said circuit at said upper limit of said temperature range.

6. In combination with an adjustable valve for varying the heat supply to an enclosed space, an electrically operated impeller for ventilating the space, and a variable resistance in the operating circuit of the impeller for controlling its operating speed; of a reversible electric motor operable in one direction to adjust said valve and said variable resistance to increase the supply of heat and to reduce the speed of said impeller and operable in a reverse direction to adjust said valve and said variable resistance to decrease the supply of heat and to increase the speed of said impeller, means for controlling the directional energization of said motor comprising a thermostat responsive to the temperatures within the space and operable at a predetermined temperature to effect energization of said motor in one direction and operative at a predetermined lower temperature to effect energization of the motor in a reverse direction, an electrical auxiliary heater for the thermostat, an energizing circuit therefor, a relay for closing said heater energizing circuit, and a control circuit for said relay connected through said thermostat at a point representing the higher of said predetermined temperatures, whereby said relay is effective below the said predetermined higher temperature to close said heater energizing circuit and to open said circuit at said higher temperature, a variable resistor in said heater circuit, and means operatively connected with said motor for inversely varying the supply of heating current to said auxiliary heater in relation to the concomitant change in the speed of said impeller.

7. In combination with adjustable means for varying the heat supply to an enclosed space, a plurality of electrically operated fans, connected in series, for ventilating said space, and a variable resistance in the operating circuit of said fans for controlling their operating speeds; of a reversible electric motor operatively connected to said heat varying means and to a movable contact of said variable resistance, whereby operation of the motor in one direction increases the supply of heat and reduces the operating speed of said fans and the operation of the motor in a reverse direction decreases the supply of heat and increases the operating speed of the fans, means for controlling the directional energization of said motor comprising a thermostat responsive to the temperatures within the space and provided with spaced contacts representing the lower and upper limits, respectively, of a predetermined temperature range, a relay for closing a motor energizing circuit for operating the motor in the direction to increase the supply of heat and decrease the speed of said fans, an energizing circuit for operating said relay, a control circuit connected through the lower contact of said thermostat for controlling the energization of said relay, a second relay for closing a circuit through said motor for operating the motor in a reverse direction, an energizing circuit for said relay, and a control circuit connected through the upper contact of said thermostat for making the energizing circuit of said second relay effective and ineffective, respectively, when the temperature at the thermostat stands below and above said lower contact.

8. In combination with adjustable means for varying the heat supply to an enclosed space, a plurality of electrically operated fans, connected in series, for ventilating said space, and a variable resistance in the operating circuit of said fans for controlling their operating speeds; of a reversible electric motor operatively connected to said heat varying means and to a movable contact of said variable resistance, whereby operation of the motor in one direction increases the supply of heat and reduces the operating speed of said fans and the operation of the motor in a reverse direction decreases the supply of heat and increases the operating speed of the fans, means for controlling the directional energization of said motor comprising a thermostat responsive to the temperatures within the space and provided with spaced contacts representing the lower and upper limits, respectively, of a predetermined temperature range, a relay for closing a motor energizing circuit for operating the motor in the direction to increase the supply of heat and decrease the speed of said fans, an energizing circuit for operating said relay, a control circuit connected through the lower contact of said thermostat for controlling the energization of said relay, a second relay for closing a circuit through said motor for operating the motor in a reverse direction, an energizing circuit for said relay, a control circuit connected through the upper contact of said thermostat for making the energizing circuit of said second relay effective and ineffective, respectively, when the temperature at the thermostat stands below and above said lower contact, an electrical auxiliary heater for the thermostat, an energizing circuit therefor connected through the second mentioned relay, a variable resistance in this heater circuit, and means connected with the motor for varying the supply of heating current to said auxiliary heater in relation to the extent of the movement of said motor.

9. In combination with adjustable means for varying the heat supply to an enclosed space, a plurality of electrically operated fans, connected in series, for ventilating said space, and a variable resistance in the operating circuit of said fans for controlling their operating speeds; of a reversible electric motor operatively connected to said heat varying means and to a movable contact of said variable resistance, whereby operation of the motor in one direction increases the supply of heat and reduces the operating speed of said fans and the operation of the motor in a reverse direction decreases the supply of heat and increases the operating speed of the fans, means for controlling the directional energization of said motor comprising a thermostat responsive to the temperatures within the space and provided with spaced contacts representing the lower and upper limits, respectively, of a predetermined temperature range, a relay for closing a motor energizing circuit for operating the motor in the direction to increase the supply of heat and decrease the speed of said fans, an energizing circuit for operating said relay, a control circuit connected through the lower contact of said thermostat for controlling the energization of said relay, a second relay for closing a circuit through said motor for operating the motor in a reverse direction, an energizing circuit for said relay, a control circuit connected through the upper contact of said thermostat for making the energizing circuit of said second relay effective and ineffective, respectively, when the temperature at the thermostat stands below and above said lower contact, an electrical auxiliary heater for the thermostat, an energizing circuit therefor connected through the second mentioned relay, a variable resistance in this heater circuit, means connected with the motor for varying the supply of heating current to said auxiliary heater in relation to the extent of the movement of said motor, and another heater circuit connected through the first mentioned relay whereby this heater circuit is made effective only when the first mentioned relay is effective to close its motor operating circuit.

10. In combination with adjustable means for varying the heat supply to an enclosed space, a plurality of electrically operated fans, connected in series, for ventilating said space, and a variable resistance in the operating circuit of said fans for controlling their operating speeds; of a reversible electric motor operatively connected to said heat varying means and to a movable contact of said variable resistance, whereby operation of the motor in one direction increases the supply of heat and reduces the operating speed of said fans and the operation of the motor in a reverse direction decreases the supply of heat and increases the operating speed of the fans, means for controlling the directional energization of said motor comprising a thermostat responsive to the temperatures within the space and provided with spaced contacts representing the lower and upper limits, respectively, of a predetermined temperature range, a relay for closing a motor energizing circuit for operating the motor in the direction to increase the supply of heat and decrease the speed of said fans, an energizing circuit for operating said relay, a control circuit connected through the lower contact of said thermostat for controlling the energization of said relay, a second relay for closing a circuit through said motor for operating the motor in a reverse direction, an energizing circuit for said relay, a control circuit connected through the upper contact of said thermostat for making the energizing circuit of said second relay effective and ineffective, respectively, when the temperature at the thermostat stands below and above said lower contact, an electrical auxiliary heater for the thermostat, an energizing circuit therefor connected through the second mentioned relay, a variable resistance in this heater circuit, an impedance circuit of fixed resistance around said variable resistance, means connected with the motor for varying the supply of heating current to said auxiliary heater in relation to the extent of the movement of said motor, and another heater circuit connected through the first mentioned relay whereby this heater circuit is made effective only when the first mentioned relay is effective to close its motor operating circuit.

TIMOTHY J. LEHANE.
EVERETT H. BURGESS.

REFERENCES CITED

The following references are of record in the file of this patent:

UNITED STATES PATENTS

| Number | Name | Date |
|---|---|---|
| 818,229 | Chadborn | Apr. 17, 1906 |
| 2,154,523 | Midyette | Apr. 18, 1939 |
| 2,170,310 | Shivers | Aug. 22, 1939 |
| 2,257,742 | Greenlee | Oct. 7, 1941 |
| 2,474,048 | Greenlee | June 21, 1949 |

Certificate of Correction

Patent No. 2,534,174 December 12, 1950

TIMOTHY J. LEHANE ET AL.

It is hereby certified that error appears in the printed specification of the above numbered patent requiring correction as follows:

Column 2, line 4, for "duirng" read *during*; column 4, line 25, for "currtnt" read *current*; column 7, line 61, for the word "carrying" read *varying*;

and that the said Letters Patent should be read as corrected above, so that the same may conform to the record of the case in the Patent Office.

Signed and sealed this 6th day of March, A. D. 1951.

[SEAL]

THOMAS F. MURPHY,
*Assistant Commissioner of Patents.*